July 7, 1959  A. C. HUSSNIGG  2,893,462
DEVICE FOR MANUFACTURING CONTINUOUS, SPIRALLY GROOVED
TUBING WOUND OF BAND MATERIAL
Filed Dec. 1, 1953  3 Sheets-Sheet 1

INVENTOR.
AUGUST CARL HUSSNIGG
BY Fredrick E. Hare
ATTORNEY

July 7, 1959
A. C. HUSSNIGG
2,893,462
DEVICE FOR MANUFACTURING CONTINUOUS, SPIRALLY GROOVED
TUBING WOUND OF BAND MATERIAL
Filed Dec. 1, 1953
3 Sheets-Sheet 2
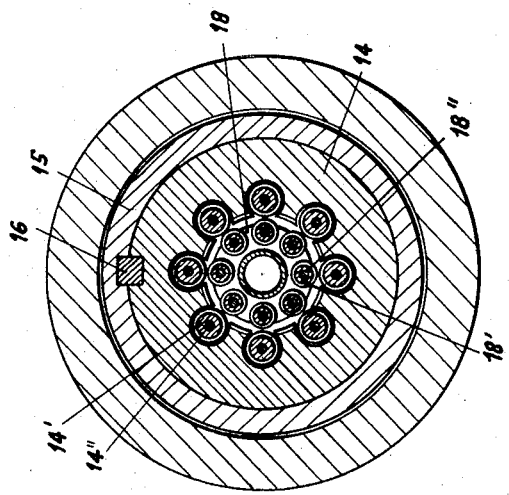
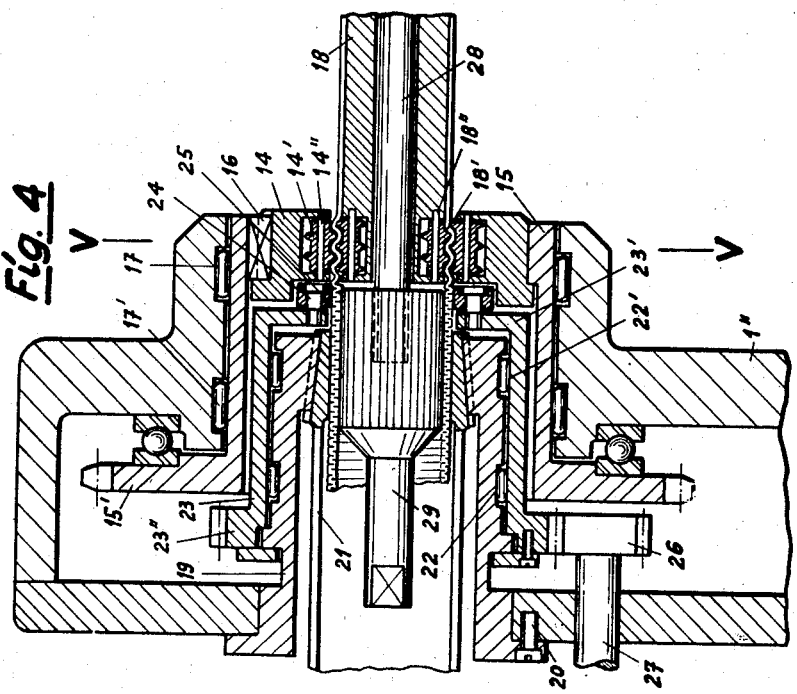
INVENTOR.
AUGUST CARL HUSSNIGG
BY
ATTORNEY July 7, 1959 A. C. HUSSNIGG 2,893,462
DEVICE FOR MANUFACTURING CONTINUOUS, SPIRALLY GROOVED
TUBING WOUND OF BAND MATERIAL
Filed Dec. 1, 1953 3 Sheets-Sheet 3
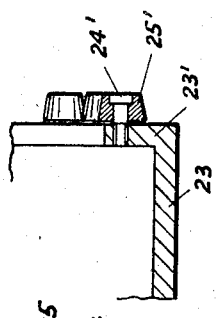
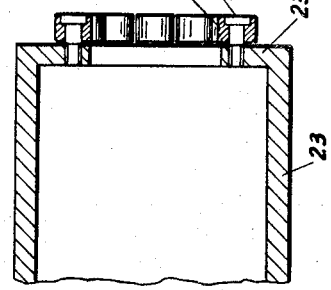
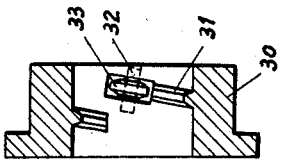
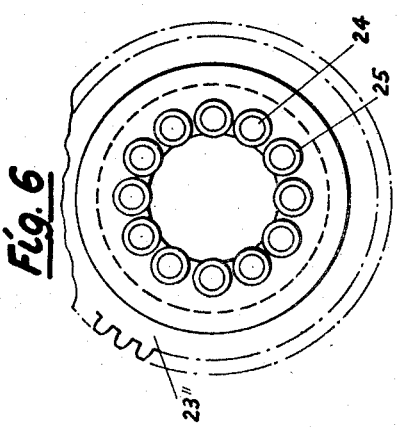
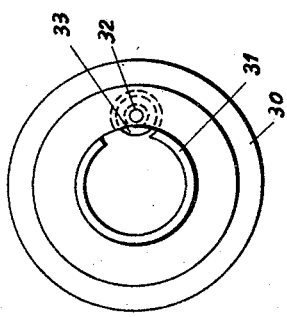
INVENTOR.
AUGUST CARL HUSSNIGG
BY
ATTORNEY United States Patent Office 2,893,462
Patented July 7, 1959

2,893,462

DEVICE FOR MANUFACTURING CONTINUOUS, SPIRALLY GROOVED TUBING WOUND OF BAND MATERIAL

August Carl Hussnigg, Zurich, Switzerland

Application December 1, 1953, Serial No. 395,531

Claims priority, application Switzerland January 23, 1953

8 Claims. (Cl. 153—72)

There are known devices for the manufacture of continuous, spirally grooved tubing from band material in which the band material is wound upon a mandrel, grooved by means of a grooving device including a grooving nut and a grooving worm, withdrawn from the mandrel and finally axially compressed by retarding its forward travel for the purpose of increasing the flexibility of the grooved tubing. The grooving nut is provided on its outlet side with an extension which serves to flatten or smooth the grooves of the tubing. The grooving of the tubing, the withdrawal from the mandrel and the retarding of the forward travel generate considerable heat which adversely affects the permissible velocity of the travel of the tubing and becomes so high when heavier band material is used that an adequate cooling of the tools and the tubing is no longer possible. Furthermore the wear and tear experienced by the grooving nut and the grooving worm are rather considerable so that the useful period of life of these members is rather short. The extension of the grooving nut which effects the flattening or smoothing of the grooves of the tubing is subjected to a particularly high wear and tear as this extension must flatten the edge of the band material which runs along the grooves.

As a result of the aforedescribed conditions it is not possible with devices as heretofore known, to manufacture tubing of large diameter and to use as band material iron having a gauge of more than 0.2 mm.

One of the objects of the present invention is to provide novel and improved means greatly reducing the heat generated by the grooving, compressing and subsequent smoothing of tubing wound of band material thereby permitting a substantial increase in production.

Another object of the invention is to provide novel and improved means for smoothing or flattening the grooved and compressed tubing which are adjustable independently of the grooving means. As the generation of heat is particularly high during the smoothing operation, a reduction of the rotational speed of the smoothing means relative to the rotational speed used for the grooving means, as made possible by the aforesaid independent adjustability of the smoothing means, will result in an appreciable decrease in the generation of heat.

Still another object of the invention is to provide smoothing or flattening means in which the frictional contact between the flattening component of the smoothing or flattening means and the tubing material is substantially a rolling one. Such rolling contact obviously generates much less heat than a sliding frictional contact generally used in flattening means as heretofore known.

According to a now preferred embodiment of the present invention, the grooves are formed in the tubing by at least one grooving roll on the grooving nut and at least one coacting grooving roll on the grooving worm and by subsequently smoothing and flattening of the grooves, thus formed, by a grooving means separated from the grooving nut and rotated independently of the same.

Extensive tests have shown that as a result of pressing the grooves into the tubing material by grooving rolls instead of pressing the same into the tubing material by threads and by separating the smoothing means from the means for grooving the tubing, the generation of heat can be greatly reduced and the production correspondingly increased. The provision of drive means for the smoothing means which are independent from the drive means for the grooving nut of the grooving means permits to adapt the revolutions of the smoothing means to the specific conditions of the operation, in particular to reduce the rotation of the smoothing means relative to the rotation of the grooving nut.

The generation of heat which with conventional devices is particularly high in the smoothing means can be further reduced by providing flattening rolls for the smoothing operation which transform the sliding friction between the tubing material and the smoothing member of conventional devices into a rolling friction. The result is not only an appreciable reduction in the generation of heat but the possibility of using considerably heavier band material than was heretofore possible.

The tubing can be wound from one of several bands, and the bands may consist of metal for instance iron, steel or copper or of a non-metallic material such as paper, plastic or fabric.

Other and further objects, features and advantages of the invention will be pointed out hereinafter and set forth in the appended claims forming part of the application.

In the accompanying drawing several now preferred embodiments of the invention are shown by way of illustration and not by way of limitation.

In the drawing:

Fig. 2 is an axial section of a conventional tool head of a device of the type generally herein referred to.

Fig. 4 is an axial section through a tool head according to the invention.

Fig. 5 is a section taken on line V—V of Fig. 4.

Fig. 6 is a front view of the grooving means including the flattening rolls for smoothing the grooves in the tubing as seen in axial direction from the grooving device.

Fig. 7 is a fragmentary axial section of Fig. 6.

Fig. 8 is a fragmentary axial section similar to Fig. 7 showing a modification of the flattening rolls.

Fig. 9 is a front view of a modification of the grooving nut seen in axial direction, and Fig. 10 is an axial section of the grooving nut according to Fig. 9.

The general arrangement of a device according to the invention for manufacturing continuous, spirally grooved tubing is similar to devices or machines already known for the purpose. The essential distinctions between the machine according to the invention and a conventional machine reside in the arrangement of the tool head and the tools for grooving the tubing formed on the mandrel from band material and of the means for smoothing or flattening the grooves formed in the material.

Figure 1:
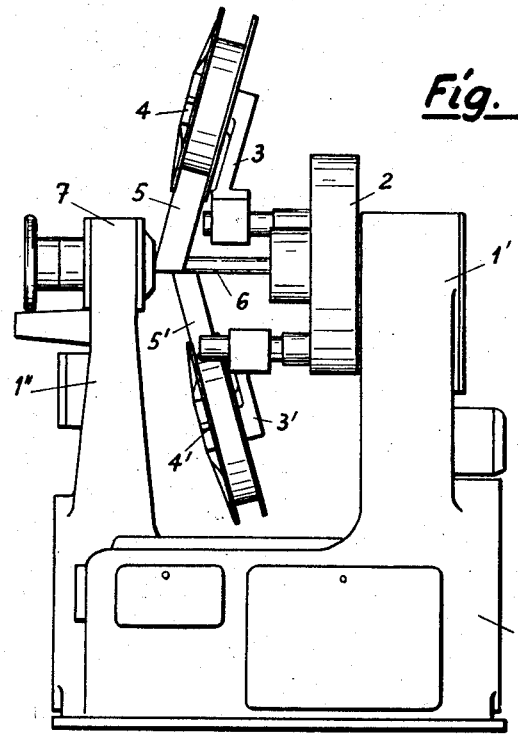
Fig. 1 is a diagrammatic elevational view of a device for manufacturing continuous spirally grooved tubing from band material.

As shown in Fig. 1, a device or machine of the general type here referred to, comprises a frame 1 having a standard 1' for the spindle and a counter-standard 1". The spindle standard 1' mounts a rotor 2 which is rotated by a variable speed gearing housed within frame 1. Rotary 2 supports two reel carriers 3 and 3' upon which supply reels 4 and 4' are fitted. Two bands 5 and 5' are fed from these reels and wound with overlap upon a mandrel 6. The smooth tubing thus formed on the mandrel is guided through a tool head 7 supported by counter-standard 1" and grooved within the tool head. The grooved tubing is withdrawn from the mandrel and subsequently axially compressed by retarding means retarding the travel of the tubing thereby increasing the flexibility of the tubing.

Figure 2:
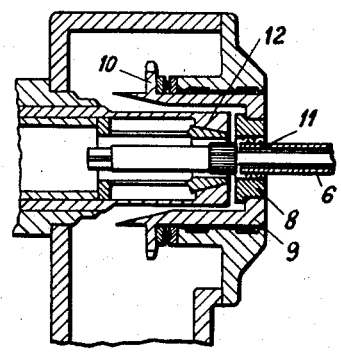
Figure 3:
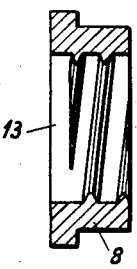
Fig. 3 is an axial section through the grooving nut of the tool head according to Fig. 2 on an enlarged scale.

To facilitate the understanding of the invention, tool heads of conventional design are diagrammatically shown in Figs. 2 and 3.

The grooving of the smooth tubing is effected by a grooving nut 8 fitted in a bushing 9 rotated by means of a sprocket 10 and a chain drive from a variable speed gearing mounted within frame 1. To simplify the drawing, the chain drive and the gearing are not illustrated and should be visualized as being of conventional design. Grooving nut 8 coacts with a grooving worm 11 which is rotated with the same velocity as nut 8. As shown in Fig. 2, grooving worm 11 may be mounted at the free end of mandrel 6. It is also possible to provide a shaft for the grooving nut and to extend this shaft through a hollow mandrel. The shaft is then rotated with the same velocity as the grooving nut in which case the mandrel may be stationary. Behind the grooving members 8, 11, as seen in the direction of travel of the now grooved tubing, a retarding means 12 is provided for the purpose of axially compressing the tubing.

The grooved tubing is smoothed when it leaves nut 8 and worm 11 by a smooth extension 33 provided on the outlet side of nut 8 integral with the same.

Referring now to Figs. 4 and 5 which show a tool head according to the invention, the tool head according to these figures comprises a nut 14 in the inner peripheral wall of which a plurality of circumferentially spaced, axially elongated recesses are provided. In these recesses, grooving rolls 14' are inserted which are rotatably mounted on pins 14". Nut 14 is fitted in a bushing or sleeve 15 and keyed to the same by a key or wedge 16 for rotation in unison. Bushing 15 is rotatably mounted in counter-standard 1" by roller bearings 17 and 17'. A sprocket or gear 15' is fixedly mounted on a radial flange of bushing 15. This sprocket and with it bushing 15 are rotated by a chain (not shown) from a speed adjustable gearing within frame 1. Grooving rolls 14' coact with grooving rolls 18' rotatably mounted on pins 18" disposed in recesses provided in an extension of a grooving worm 18. As can best be seen in Fig. 5, the said recesses are circumferentially spaced. Grooving worm 18 is formed with a shaft portion which serves as the mandrel for the band material and is rotated with the same velocity as grooving nut 14. For this purpose, worm 18 and nut 14 may be driven from a common shaft as shown in United States Patents 2,002,896 and 2,033,717.

The counter-standard 1" mounts a bushing 19 fixedly secured thereto by means of a screw 20. A retarding means 21 tapered at its end facing grooving rolls 14' and 18', is fitted in bushing 19. The bushing further mounts a flattening ring or sleeve 23 rotatable on the bushing by means of roller bearings 22 and 22'. This ring extends into bushing 15 and is provided at its end adjacent to grooving nut 14 with a radial inwardly directed flange 23'. In this flange are threaded circumferentially spaced bolts 24 upon which flattening rolls 25 are rotatably mounted. These rolls are disposed directly behind nut 14 as seen in the direction of travel of the tubing. Ring 23 has thereon a gearing 23" which is in mesh with a gear 26 seated on a drive shaft 27. Ring 23 is rotated through shaft 27 and gears 26 and 23." Worm 18 is formed with an axial bore through which is extended a shaft 28 mounting on its rear end, as seen in direction of travel of the tubing, a preferably longitudinally milled member 29 which serves to prevent a twisting or torsion of the grooved tubing.

The tubing which is formed on a mandrel or shaft of worm 18 respectively by winding of the band material with overlap is passed between grooving rolls 14' of nut 14 and grooving rolls 18' of worm 18. The grooving rolls 14' and 18' should be visualized as being slanted as shown in Figs. 9 and 10 for the corresponding grooving rolls, the scale of Fig. 4 being too small to allow showing of the slant in this figure. Due to the slant of the grooving rolls, the forming tubing is in effect screwed through the device and hence fed through the same. As a result the initially smooth tubing is spirally grooved and simultaneously drawn off worm 18. The outside of the grooved tubing is then flattened or smoothed by rolls 25. The retarding member retards the forward travel of the grooved and smoothed tubing whereby the tubing is axially compressed to such an extent that the flanks of its grooves touch each other at least approximately whereby the tubing obtains the required flexibility. Simultaneously, member 29 prevents a torsion or rotation of the tubing by the action of the rolls so that the same leaves the tool head without rotating and can be wound without difficulty upon a supply drum.

In the embodiment according to Figs. 4 and 5 the flattening rolls 25 of ring 23 are of cylindrical shape as can best be seen in Figs. 6 and 7.

Fig. 8 shows an arrangement in which frustoconical flattening rolls 25' are provided which are mounted on bolts 24' supported by ring 23. The narrow diameter of rolls 25' faces nut 14.

Figs. 9 and 10 show a modification of the means for producing the spiral grooves in the tubing.

According to Figs. 9 and 10, these means comprise a grooving nut 30 the inner peripheral wall of which is formed with one thread 31. A pin 32 is inserted in nut 30 at the beginning of thread 31. The pin is perpendicular to the direction of the thread and supports a grooving roll 33.

As is apparent, two or more grooving rolls 33 and 37 respectively can be mounted in succession in threads 31 and 35 respectively.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for manufacturing continuous, spirally grooved tubing wound of band material, comprising rotary grooving means including an outer nut member and an inner worm member in coaxial disposition, each of said members having at least one rotary grooving roll, guide means for guiding the tubing between said rolls, the said rolls coacting with each other for pressing spiral grooves in the tubing and each having a rotational axis slanted relative to the longitudinal axis of the tubing so as to transport the tubing through the guide means, rotary flattening means acting upon grooved tubing for smoothing the spiral grooves, said rotary flattening means being disposed in posterior spaced relationship to the grooving means as seen in the direction of travel of the tubing through the device, first drive means for rotating said nut member and said worm member respectively in the same direction and at the same speed, second drive means for rotating the flattening means independently from the grooving means, and retaining means disposed within the tubing posterior of said grooving means as seen in the direction of travel of the tubing through the device and engaging the inner wall of the grooved tubing to prevent rotation thereof by the grooving means.

2. A device according to claim 1, wherein a plurality of said grooving rolls are rotatably mounted on the inner periphery of the nut member in uniform spacing and a plurality of grooving rolls are rotatably mounted on the outer periphery of the worm member, the said rolls of the two members being disposed in a spatial relationship such as to effect said spiral grooving of tubing passing between the coacting rollers of the tubing members.

3. A device according to claim 1, wherein the inner periphery of the nut member and the outer periphery of the worm member are each formed with an internal thread and an external thread respectively, and wherein a respective one of said grooving rolls is rotatably mounted at the beginning of each thread.

4. A device according to claim 3, wherein at least two grooving rolls are rotatably mounted on each of said members and disposed spaced apart from each other in the direction of the extension of the respective thread.

5. A device according to claim 1, wherein said flattening means includes a sleeve rotatable independently of said nut member in coaxial relationship therewith and disposed posterior to the grooving means as seen in the direction of travel of the tubing, a plurality of smoothing rolls rotatably mounted in circumferentially spaced arrangement at the end of said sleeve facing the grooving means, said rolls being disposed to press against the grooved tubing emerging from the grooving means for flattening the grooves in the tubing.

6. A device according to claim 5, wherein the said smoothing rolls are cylindrically shaped.

7. A device according to claim 5, wherein the said smoothing rolls are frusto-conically shaped, the narrow face side of said rolls facing the grooving means.

8. A device according to claim 1, wherein said retaining means comprise a stationarily mounted longitudinally grooved cylindrical member disposed in alignment with said guide means.

References Cited in the file of this patent

UNITED STATES PATENTS

| | | |
|---|---|---|
| 798,448 | Pogany et al. | Aug. 29, 1905 |
| 2,002,896 | Kopetz | May 28, 1935 |
| 2,033,717 | Kopetz | Mar. 10, 1936 |
| 2,734,472 | Bornand | Feb. 14, 1956 |

FOREIGN PATENTS

| | | |
|---|---|---|
| 19,595 | Great Britain | of 1890 |
| 375,676 | Great Britain | June 30, 1932 |
| 449,486 | Great Britain | June 29, 1936 |
| 263,079 | Switzerland | Nov. 1, 1949 |